United States Patent

[11] 3,627,191

[72] Inventor Jesse Carl Hood, Jr.
817 Dumaine Ave., San Dimas, Calif. 91773
[21] Appl. No. 713,976
[22] Filed Mar. 18, 1968
[45] Patented Dec. 14, 1971

[54] SOLDER WICK
2 Claims, 5 Drawing Figs.

[52] U.S. Cl. ..................................... 228/19,
117/121.2, 228/35
[51] Int. Cl. ........................................ B23k 1/00,
B23k 5/22
[50] Field of Search............................. 29/426,
427; 228/19, 20, 35, 52, 56, 57; 156/344; 117/8,
10, 98, 102, 128, 181, 121.2, 71 M, DIG. 19;
431/325; 339/225

[56] References Cited
UNITED STATES PATENTS

| | | | |
|---|---|---|---|
| 1,484,202 | 2/1924 | Baker............................ | 339/275 |
| 2,365,539 | 12/1944 | Flowers........................ | 29/495 X |
| 2,504,509 | 4/1950 | Erickson....................... | 29/489 X |
| 2,577,187 | 12/1951 | Fox ............................... | 29/489 X |
| 2,694,852 | 11/1954 | Rogers ......................... | 29/489 X |
| 2,907,104 | 10/1959 | Brown et al................... | 29/495 X |
| 3,083,952 | 4/1963 | Goodloe et al. .............. | 431/325 X |
| 3,316,384 | 4/1967 | Daniels.......................... | 228/19 X |
| 3,371,249 | 2/1968 | Prohofsky ..................... | 228/35 X |
| 935,229 | 9/1909 | Phelps........................... | 228/35 |
| 1,238,671 | 8/1917 | Holcomb....................... | 228/35 |
| 1,508,865 | 9/1924 | Williams........................ | 228/57 X |
| 2,791,669 | 5/1957 | Ferrara.......................... | 228/35 |
| 2,530,552 | 11/1950 | Stoddard....................... | 228/19 |
| 2,972,657 | 2/1961 | Stemke.......................... | 228/56 |
| 3,358,898 | 12/1967 | Medkeeff et al.............. | 228/56 |

OTHER REFERENCES

American Welding Society, Soldering Manual, 1959, page 35.

Manko, Solders and Soldering, 1964, p. 215 & 246.

Primary Examiner—John F. Campbell
Assistant Examiner—R. J. Craig
Attorney—Nilsson, Robbins, Wills & Berliner ABSTRACT: A solder-removing wick of copper strands having an exterior capillary surface of copper directly and substantially entirely coated with a noncorrosive flux. The wick is coated by contacting it with a flux solution that wets it sufficiently to substantially entirely coat its exterior surface while retaining the capillary properties of the surface.

PATENTED DEC 14 1971 3,627,191

INVENTOR.
JESSE C. HOOD, JR
BY
NILSSON & ROBBINS
ATTORNEYS.

SOLDER WICK

BACKGROUND OF THE INVENTION

1. Field of the Invention

The fields of art to which the invention pertains include the field of metal heating, particularly soldering, and the field of coating, particularly as applied to wick bases.

2. Description of the Prior Art

Solder-pulling wicks are used to quickly and economically remove a solder connection. Such wicks are made of metal strands braided to provide a capillary surface. In operation, the wick is placed on the solder connection and the connection is heated through the wick with a soldering iron. The solder melts and is drawn up onto the wick by capillary forces.

Such wicks are generally made of copper, for its heat-conducting property, and flux is applied to the solder connection prior to contact with the wick to improve the wetting properties of the solder. Solder-pulling wicks have recently been provided with an overcoating of flux so that flux need not be separately applied to the solder connection. However, it has been found that when copper wicks are merely overcoated with flux, they tend to rapidly corrode and have a short shelf life. Accordingly, the wicks are typically precoated with tin or other noncorrosive metal prior to being overcoated with flux. Such precoating substantially increases the cost of the wicks.

SUMMARY OF THE INVENTION

The present invention provides a copper solder-pulling wick coated with flux, but which does not readily corrode and which has a long shelf life. The wick has an exterior capillary surface of copper and is directly and substantially entirely coated with a noncorrosive flux. A coating process is provided wherein the wick is contacted with a flux solution that wets the wick surface sufficiently to substantially entirely coat it while retaining its capillary properties.

In specific embodiments, the flux is rosin and the solvent portion of the flux solution is substantially more volatile than water. In a particular embodiment the solvent has an atmospheric boiling point of less than 85° C. In other particular embodiments, the solvent has an air contact surface tension of less than 30 dynes/cm.

DESCRIPTION OF THE PREFERRED EMBODIMENT

Figure 1:
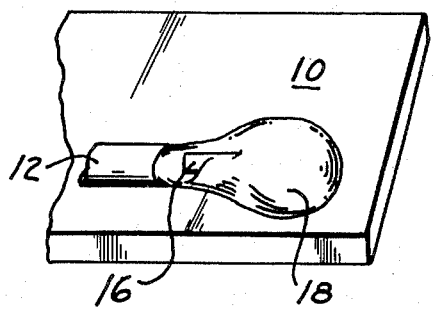
FIG. 1 is a perspective view of a solder connection on a printed circuit board from which the solder is to be removed.
Figure 3:
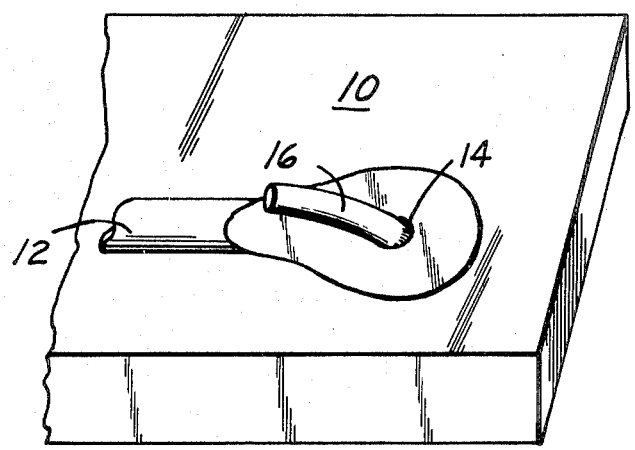
FIG. 3 is a perspective view of the unsoldered wire components of FIG. 1 following removal of the solder connecting them.

Referring to FIGS. 1 and 3, a printed circuit board 10 is shown having a printed, connecting strip 12 thereon adjacent a lead hold 14 (FIG. 3) from which protrudes a copper wire 16 from a component (not shown) affixed beneath the board 10. A globule of solidified solder 18 (FIG. 1) connects the wire 16 to the connecting strip 12.

Figure 2:
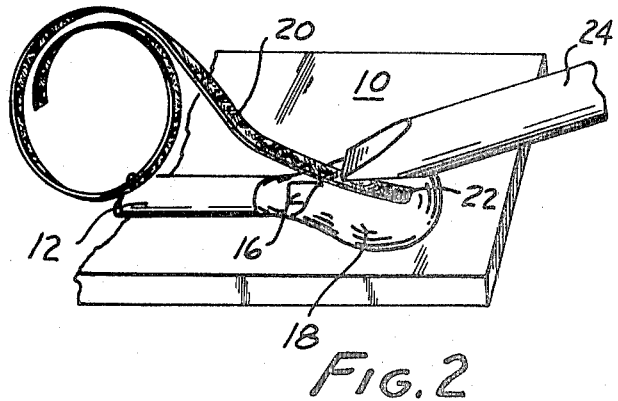
FIG. 2 is a perspective view of a solder-pulling wick of this invention in operation, removing the solder from the connection of FIG. 1.

In the event of a faulty connection, or for any other reason, one may remove the solder globule 18 by utilizing a solder-pulling wick 20 of this invention. Referring to FIG. 2, a rolled-up length of solder-pulling wick 20 is shown with an end 22 thereof overlying the solder globule 18. A hot soldering iron tip 24 (rated at about 40–5 watts) is placed atop the wick end 22 so that its heat is transferred to the solder globule 18. After a moment of such contact the solder globule 18 melts and is immediately drawn up onto the wick end 22 by capillary action. The wick end 22 and soldering iron tip 24 are removed simultaneously to leave the wire 16 and connecting strip 12 free of solder, as shown in FIG. 3.

Figure 4:
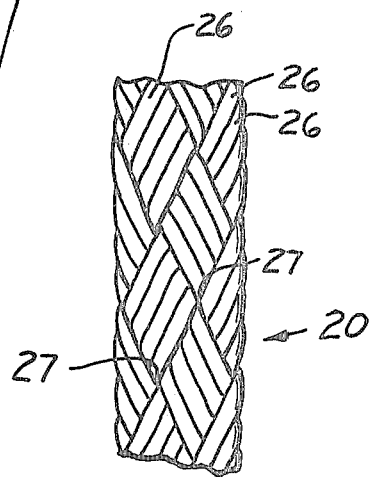
FIG. 4 is a plan, close-up view of the solder-pulling wick depicted in FIG. 2.

Referring to FIG. 4, the wick 20 comprises a braid of strands 26 of copper wire and entirely overcoated with flux. In this case, the wire is 40-gauge and the strands 26 are in groups of four. The wick is braided from a machine having 16 heads so that the wick is 64 strands thick with 23 tucks 27 per inch. Other grades of wire, and braiding patterns can be used, e.g., 96 strands of 44 gauge can be braided in 16 groups of six strands, etc.

Figure 5:
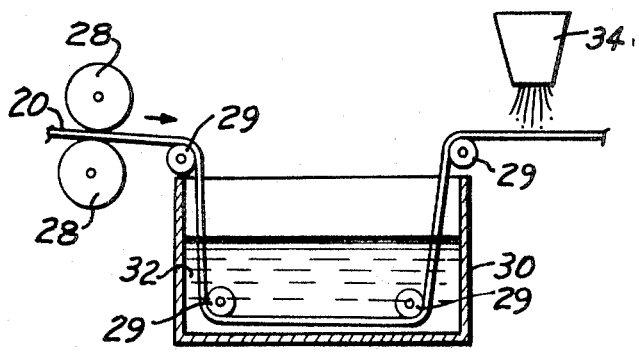
FIG. 5 is a diagrammatic representation of a process for coating the wick.

Referring to FIG. 5, the somewhat-tubular braided wick 20 is flattened by pressure rollers 28 and from there travels over and under guide rollers 29 into a tank 30 of flux solution 32. From there it travels past a hot-air blower 34 and, after drying, to a takeup roller (not shown). In the event that the wick 20 is already in flattened form, the pressure rollers 28 may be omitted.

The flux solution 32 is such as to wet the exterior surface of the wick 20 sufficiently to substantially entirely coat such surface while retaining its capillary properties. Any of a number of common solvents can be used for this purpose; generally, any solvent for the flux having an air contact surface tension of less than about 30 dynes/cm. and which is substantially more volatile than water can be used where time and volume production are important. Solvents having an atmospheric boiling point of greater than room temperature and less than about 85° C. are particularly suitable. Such solvents include: acetone, cyclohexane methyl formate, tert-butyl alcohol, ethyl bromide, vinyl acetate, n-propylamine, ethylene chloride, methyl sulfide, n-hexane, isopentane, methyl acetate, methyl alcohol, n-propyl formate, acetyl chloride carbon tetrachloride, ethyl acetate, ethyl alcohol, methylene chloride, methyl ethyl ketone, ethyl formate, isopropyl alcohol, and the like and mixtures thereof.

Solvents boiling well below room temperature can also be used such as dimethylamine or acetaldehyde but appropriate refrigeration should be utilized. Mixtures of solvents can advantageously be used, especially to increase the solubility of the flux.

As flux, one can use any noncorrosive flux, such as the methyl ester of abietic acid, the methyl ester of pimaric acid, or rosin, e.g., pine rosin or rosin obtained from tall oil by removal of fatty acid components. The rosins are particularly suitable as being highly effective under a wide variety of conditions.

When using a rosin, a particularly effective solution thereof is obtained by dissolving about 25 parts by weight of the rosin in about 75 parts by weight of a 4:1 volume mixture of methyl acetate: methyl alcohol. The solder wick can be submerged in such solution for about 0.5–1 second and then dried with the hot-air blower 34 to yield a wick having rosin flux completely coating its entire exterior surface and yet retaining capillary properties.

The foregoing process allows direct contact between the copper surface of the wick and the flux. Activators are not required as they are for fluxes in contact with tin plated wicks; accordingly, the wick can be used with high quality electrical solder connections with a minimum danger of corroding the connection. The process also allows thinner coatings of flux to be applied to the wick, leaving less residue in use than more thickly coated tin-plated wicks.

It will be understood that various modifications and changes can be made without departing from the spirit and scope of the invention.

What is claimed is:

1. Copper strands elongatedly braided in the form of a consumable wick for drawing up molten solder by capillary action, said wick having an exterior capillary surface of copper, each strand having substantially along its entire length its exposed surface directly in contact and substantially entirely coated with a noncorrosive solder flux applied from a volatile solvent solution of 25 weight percent or less of said flux.

2. The invention according to claim 1 wherein said solder flux is a pine rosin, a rosin obtained from tall oil by removal of fatty acid components, a methyl ester of abietic acid, or a methyl ester of pimaric acid.

* * * * *